United States Patent
Matsubara

(10) Patent No.: US 11,169,079 B2
(45) Date of Patent: Nov. 9, 2021

(54) CAPTURED IMAGE EVALUATION APPARATUS, CAPTURED IMAGE EVALUATION METHOD, AND CAPTURED IMAGE EVALUATION PROGRAM

(71) Applicant: FUJIFILM Corporation, Tokyo (JP)

(72) Inventor: Kenta Matsubara, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 111 days.

(21) Appl. No.: 16/291,068

(22) Filed: Mar. 4, 2019

(65) Prior Publication Data

US 2019/0195777 A1 Jun. 27, 2019

Related U.S. Application Data

(63) Continuation of application No. PCT/JP2017/026745, filed on Jul. 25, 2017.

(30) Foreign Application Priority Data

Sep. 28, 2016 (JP) .............................. JP2016-189793

(51) Int. Cl.
*G06T 7/00* (2017.01)
*G01N 15/14* (2006.01)
(Continued)

(52) U.S. Cl.
CPC ......... *G01N 15/1475* (2013.01); *G01B 11/06* (2013.01); *G01N 21/17* (2013.01);
(Continued)

(58) Field of Classification Search
CPC . G06T 2207/10056; G06T 2207/10141; G06T 2207/30024; G06T 7/0012;
(Continued)

(56) References Cited

U.S. PATENT DOCUMENTS

2003/0227673 A1 12/2003 Nakagawa
2016/0369223 A1 12/2016 Matsumoto
(Continued)

FOREIGN PATENT DOCUMENTS

JP 10-206741 A 8/1998
JP 2002-258163 A 9/2002
(Continued)

OTHER PUBLICATIONS

"Numerical aperture", Wikipedia, Sep. 16, 2016, pp. 1-7, XP055601227, Retrieved from the Internet: URL:https://en.wikipedia.org/w/index.php?title=Numerical_aperture&oldid=739759041, 7 pages total.
Extended European Search Report dated Jul. 26, 2019 issued by the European Patent Office in counterpart application No. 17855387.1.
(Continued)

*Primary Examiner* — Siamak Harandi
(74) *Attorney, Agent, or Firm* — Sughrue Mion, PLLC

(57) ABSTRACT

Provided are a captured image evaluation apparatus, a captured image evaluation method, and a captured image evaluation program capable of evaluating a thickness and a density of stacked cultured cells in a short imaging time. The captured image evaluation apparatus includes: an image acquisition section 52 that acquires captured images obtained by imaging a subject under a condition in which a numerical aperture of an objective lens is changed; a thickness estimation section 53 that estimates a thickness of the subject on the basis of a low NA captured image obtained under a condition in which the numerical aperture of the objective lens is relatively small; and a density estimation section 54 that estimates a density of the subject on the basis of a high NA captured image obtained under a condition in which the numerical aperture of the objective lens is relatively large.

11 Claims, 6 Drawing Sheets

(51) Int. Cl.
*G02B 21/00* (2006.01)
*G01B 11/06* (2006.01)
*H04N 5/232* (2006.01)
*G03B 15/00* (2021.01)
*G01N 21/17* (2006.01)
*G01N 15/10* (2006.01)

(52) U.S. Cl.
CPC ............. *G02B 21/00* (2013.01); *G03B 15/00* (2013.01); *G06T 7/0012* (2013.01); *H04N 5/232* (2013.01); *H04N 5/23296* (2013.01); G01N 2015/1006 (2013.01); G01N 2015/1087 (2013.01); G01N 2015/1493 (2013.01); G01N 2015/1497 (2013.01); G06T 2207/10056 (2013.01); G06T 2207/10141 (2013.01); G06T 2207/30024 (2013.01)

(58) Field of Classification Search
CPC ............... G01N 15/1475; G01N 21/17; G01N 2015/1006; G01N 2015/1493; G01N 2015/1497; G01N 2015/1087; G02B 21/00; G02B 21/14; G01B 11/06; G01B 9/04; H04N 5/23296; H04N 5/232; G03B 15/00
See application file for complete search history.

(56) References Cited

U.S. PATENT DOCUMENTS

2017/0159004 A1 6/2017 Senda et al.
2019/0212124 A1* 7/2019 Zalevsky ........... G01B 9/02095

FOREIGN PATENT DOCUMENTS

| JP | 2006-271210 | A | 10/2006 |
| JP | 2012-202761 | A | 10/2012 |
| JP | 2015-166829 | A | 9/2015 |
| JP | 2016-21915 | A | 2/2016 |
| RU | 2013765 | C1 | 5/1994 |

OTHER PUBLICATIONS

International Search Report for PCT/JP2017/026745 dated Oct. 17, 2017 (PCT/ISA/210).
Written Opinion dated Oct. 17, 2017 in International Application No. PCT/JP2017/026745.
International Preliminary Report on Patentability with translation of the Written Opinion dated Apr. 2, 2019 in International Application No. PCT/JP2017/026745.
Notification of Reason for Refusal dated Dec. 19, 2019, issued by the Korean Intellectual Property Office in Application No. 10-2019-7005997.

* cited by examiner

CAPTURED IMAGE EVALUATION APPARATUS, CAPTURED IMAGE EVALUATION METHOD, AND CAPTURED IMAGE EVALUATION PROGRAM

CROSS REFERENCE TO RELATED APPLICATIONS

This application is a Continuation of PCT International Application No. PCT/JP2017/026745 filed on Jul. 25, 2017, which claims priority under 35 U.S.C § 119(a) to Patent Application No. 2016-189793 filed in Japan on Sep. 28, 2016, all of which are hereby expressly incorporated by reference into the present application.

BACKGROUND OF THE INVENTION

1. Field of the Invention

The present invention relates to a captured image evaluation apparatus, a captured image evaluation method, and a non-transitory computer recording medium storing a captured image evaluation program for performing estimation of a thickness and a density of a subject based on a captured image of the subject.

2. Description of the Related Art

Multi potential stem cells such as embryonic stem (ES) cells or induced pluripotent stem (iPS) cells are capable of being divided into cells of various tissues, and attract attention as applications to regenerative medicine, drug development, disease solution, or the like.

It is known that cells are stacked in three-dimensions as they grow up. It is important to know a thickness and a density (degree of concentration of cells) of cultured cells that are stacked in a case where the cultured cells are used in a field of regenerative medicine and drug discovery.

As a method for evaluating a state of the cultured cells, in the related art, a method for imaging cultured cells using a microscope such as a phase difference microscope and recognizing features of the captured image to evaluate a cell culture state has been proposed.

For example, in order to evaluate a state of cultured cells that are stacked as described above, JP2016-021915A proposes a method for moving a focal position of a detection optical system in a direction where the cultured cells are stacked to image a plurality of sectional images having different distances in the stacked direction from a surface on which the cultured cells are provided.

SUMMARY OF THE INVENTION

However, in capturing the plurality of sectional images while changing the focal position, as in the method disclosed in JP2016-021915A, there is a problem in that the number of times of capturing of the sectional images becomes large, and thus, an imaging time becomes long.

Further, since it is necessary to perform an analysis process by integrating multiple sectional images, a load on the analysis process also becomes large.

In consideration of the above-mentioned problems, an object of the invention is to provide a captured image evaluation apparatus, a captured image evaluation method, and a non-transitory computer recording medium storing a captured image evaluation program capable of evaluating a thickness and a density of stacked cultured cells in a short imaging time.

According to an aspect of the invention, there is provided a captured image evaluation apparatus comprising: an image acquisition section that acquires a plurality of captured images obtained by imaging a subject under a condition in which a numerical aperture of an objective lens is changed; a thickness estimation section that estimates a thickness of the subject on the basis of a low NA captured image obtained under a condition in which the numerical aperture of the objective lens is relatively small, among the plurality of captured images; and a density estimation section that estimates a density of the subject on the basis of a high NA captured image obtained under a condition in which the numerical aperture of the objective lens is relatively large, among the plurality of captured images.

In the captured image evaluation apparatus according to the aspect of the invention, the thickness estimation section may acquire a brightness distribution of the low NA captured image, and may estimate the thickness of the subject on the basis of the brightness distribution.

In the captured image evaluation apparatus according to the aspect of the invention, the thickness estimation section may include a table in which a brightness of the low NA captured image and the thickness of the subject are associated with each other.

In the captured image evaluation apparatus according to the aspect of the invention, the density estimation section may acquire a brightness distribution of the high NA captured image, and may estimate the density of the subject on the basis of the brightness distribution.

In the captured image evaluation apparatus according to the aspect of the invention, the density estimation section may estimate the density of the subject on the basis of a shape of the brightness distribution.

In the captured image evaluation apparatus according to the aspect of the invention, the density estimation section may calculate a peak included in the brightness distribution, and calculates the number of peaks per unit area to estimate the density of the subject.

In the captured image evaluation apparatus according to the aspect of the invention, the density estimation section may approximate the brightness distribution using a Gaussian function to calculate the peak.

In the captured image evaluation apparatus according to the aspect of the invention, the low NA captured image may be a captured image obtained at a relatively low magnification, and the high NA captured image may be a captured image obtained at a relatively high magnification.

In the captured image evaluation apparatus according to the aspect of the invention, the low NA captured image may be a captured image obtained by illumination light of a relatively long wavelength, and the high NA captured image may be a captured image obtained by illumination light of a relatively short wavelength.

In the captured image evaluation apparatus according to the aspect of the invention, the low NA captured image may be a captured image obtained using an aperture stop having a relatively small aperture, and the high NA captured image may be a captured image obtained using an aperture stop having a relatively large aperture.

The captured image evaluation apparatus according to the aspect of the invention may further comprise: an output section that outputs the thickness of the subject estimated by the thickness estimation section and the density of the subject estimated by the density estimation section.

According to another aspect of the invention, there is provided a captured image evaluation method comprising: acquiring a plurality of captured images obtained by imaging a subject under a condition in which a numerical aperture of an objective lens is changed; estimating a thickness of the subject on the basis of a low NA captured image obtained under a condition in which the numerical aperture of the objective lens is relatively small, among the plurality of captured images; and estimating a density of the subject on the basis of a high NA captured image obtained under a condition in which the numerical aperture of the objective lens is relatively large, among the plurality of captured images.

According to still another aspect of the invention, there is provided a non-transitory computer recording medium storing a captured image evaluation program that causes a computer to function as: an image acquisition section that acquires a plurality of captured images obtained by imaging a subject under a condition in which a numerical aperture of an objective lens is changed; a thickness estimation section that estimates a thickness of the subject on the basis of a low NA captured image obtained under a condition in which the numerical aperture of the objective lens is relatively small, among the plurality of captured images; and a density estimation section that estimates a density of the subject on the basis of a high NA captured image obtained under a condition in which the numerical aperture of the objective lens is relatively large, among the plurality of captured images.

According to the captured image evaluation apparatus, the captured image evaluation method, and the captured image evaluation program of the invention, captured images obtained by imaging a subject under a condition in which a numerical aperture of an objective lens is changed are acquired; a thickness of the subject on the basis of a low NA captured image obtained under a condition in which the numerical aperture of the objective lens is relatively small is estimated; and a density of the subject on the basis of a high NA captured image obtained under a condition in which the numerical aperture of the objective lens is relatively large is estimated. Accordingly, since it is sufficient that two times of imaging for the low NA captured image and the high NA captured image is performed, it is possible to evaluate the thickness and the density of the subject in a short imaging time.

Here, the reason why the low NA captured image is used in a case where the thickness of the subject is estimated is because a captured image including a large amount of rectilinear propagation components of light passed through the subject, in which the thickness of the subject is considered, is obtained in a case where the numerical aperture of the objective lens is small. Further, the reason why the high NA captured image is used in a case where the density of the subject is estimated is that a captured image including a large amount of scattering components of light passed through the subject, in which the density of the subject is considered, is obtained in a case where the numerical aperture of the objective lens is large.

DESCRIPTION OF THE PREFERRED EMBODIMENTS

Figure 1:
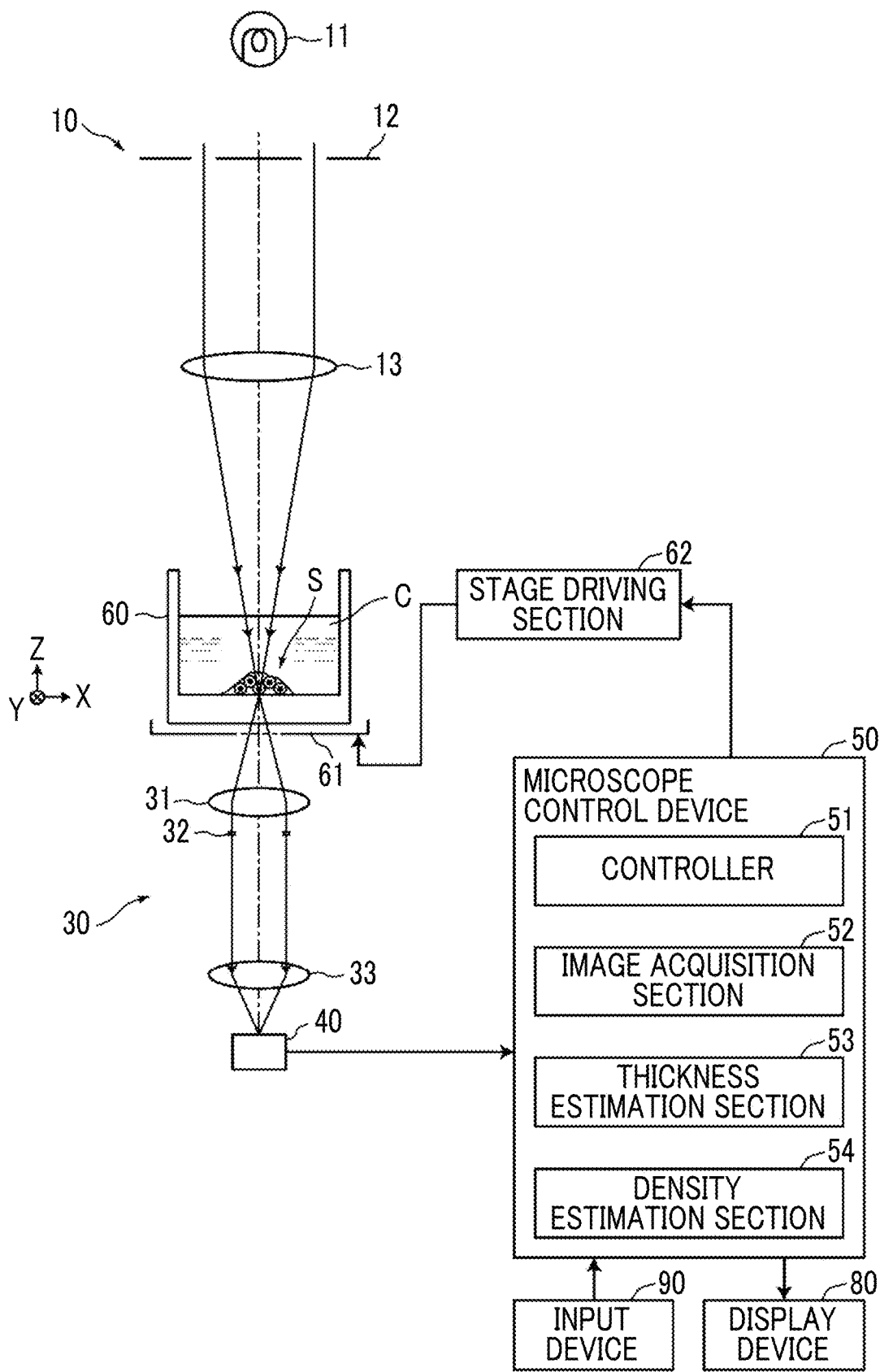
FIG. 1 is a diagram showing a schematic configuration of a microscope image evaluation system using an embodiment of a captured image evaluation apparatus of the invention.

Hereinafter, a microscope image evaluation system using an embodiment of a captured image evaluation apparatus and a captured image evaluation method will be described in detail with reference to the accompanying drawings. FIG. 1 is a diagram showing a schematic configuration of the microscope image evaluation system of an embodiment of the invention.

The microscope image evaluation system of the embodiment comprises an illumination light emission section 10, an imaging optical system 30, an imaging section 40, a microscope control device 50, a display device 80, and an input device 90, as shown in FIG. 1.

In the microscope image evaluation system of the embodiment, a stage 61 is provided between the illumination light emission section 10 and the imaging optical system 30, and a culture container 60 is placed and supported on the stage 61. A culture solution C and a subject S are accommodated in the culture container 60.

Further, the microscope image evaluation system of this embodiment comprises a stage driving section 62 for moving the stage 61 in an X direction and a Y direction. The X direction and the Y direction are directions that are orthogonal to each other on a surface parallel to an installation surface of the subject S, and a Z direction is a direction that is orthogonal to the X direction and the Y direction.

In the microscope image evaluation system of this embodiment, the illumination light emission section 10, the imaging optical system 30, the imaging section 40, the stage 61, and the stage driving section 62 form a phase difference microscope body, and the microscope control device 50 controls the phase difference microscope body. Hereinafter, a specific configuration of the phase difference microscope body will be described.

The illumination light emission section 10 irradiates the subject S contained in the culture container 60 with illumination light for so-called phase difference measurement, and in this embodiment, irradiates the culture container 60 with ring-shaped illumination light as the illumination light for the phase difference measurement.

Specifically, the illumination light emission section 10 according to the embodiment comprises a white light source 11 that emits white light for phase difference measurement, a slit plate 12 that has a ring-shaped slit, to which the white light emitted from the white light source 11 is incident, and that emits ring-shaped illumination light, and a condenser lens 13 to which the ring-shaped illumination light emitted from the slit plate 12 is incident, and that irradiates the subject S with the incident ring-shaped illumination light.

The slit plate 12 is a light screen that screens white light emitted from the white light source 11 and is formed with the ring-shaped slit through which the white light passes, in which ring-shaped illumination light is formed as the white light passes through the slit.

In the culture container 60 provided on the stage 61, a cultured cell group (cell colony) are placed as the subject S. As cultured cells, multi potential stem cells such as induced pluripotent stem (iPS) cells and embryonic stem (ES) cells, cells of nerves, the skin, the myocardium, and the liver, cells of skin extracted from a human body, the retina, the myocardium, blood corpuscles, nerves, and organs, and the like may be used. As the culture container 60, for example, a well plate on which a schale and a plurality of wells are arranged may be used.

The imaging optical system 30 forms an image of the subject S inside the culture container 60 on the imaging section 40, and comprises an objective lens 31, a phase plate 32, an image forming lens 33.

The phase plate 32 is a transparent plate that is formed with a phase ring with respect to a wavelength of the ring-shaped illumination light. The size of the slit of the above-mentioned slit plate 12 has a conjugate relationship with the phase ring.

The phase ring has a configuration in which a phase membrane that shifts a phase of incident light by a ¼ wavelength and a dimmer filter that dims the incident light are formed in a ring-shape. As direct light incident to the phase plate 32 passes through the phase ring, its phase shifts by a ¼ wavelength, and its brightness becomes weak. On the other hand, diffracted light diffracted by the subject S mostly passes through a portion of the transparent plate of the phase plate 32, and thus, its phase and brightness are not changed.

The image forming lens 33 is a member to which direct light and diffracted light passed through the phase plate 32 are incident, which forms of images of the lights on the imaging section 40.

The image optical system 30 of the embodiment is configured to be able to change an optical magnification. As a method for changing the optical magnification, for example, a method for providing a plurality of objective lenses 31 having different magnifications in the imaging optical system 30 and manually or automatically switching the plurality of objective lenses 31 may be used. In a case where the magnification of the objective lens 31 is changed, the phase plate 32 is also changed in accordance with the change of the magnification of the objective lens 31.

Here, in this embodiment, the thickness and density of the subject S are estimated on the basis of a captured image obtained by imaging the subject S. Further, in a case where the thickness of the subject S is estimated, a low numerical aperture (NA) captured image obtained by imaging under a condition in which a numerical aperture of the objective lens 31 is relatively small is used, and in a case where the density of the subject S is estimated, a high numerical aperture (NA) captured image obtained by imaging under a condition in which a numerical aperture of the objective lens 31 is relatively large is used. The reason why the low NA captured image is used in a case where the thickness of the subject S is estimated is because a captured image including a large amount of rectilinear propagation components of light passed through the subject S, in which the thickness of the subject S is considered, is obtained in a case where the numerical aperture of the objective lens 31 is small. Further, the reason why the high NA captured image is used in a case where the density of the subject S is estimated is because a captured image including a large amount of scattering components of light passed through the subject S, in which the density of the subject S is considered, is obtained in a case where the numerical aperture of the objective lens 31 is large.

In this embodiment, for example, in a case where a command input for performing estimation of the thickness of the subject S is received from a user, the magnification of the objective lens 31 is automatically changed to become relatively low so that the numerical aperture of the objective lens 31 becomes small. On the other hand, in a case where a command input for performing estimation of the density of the subject S is received from the user, the magnification of the objective lens 31 is automatically changed to become relatively high so that the numerical aperture of the objective lens 31 become large. The relatively low magnification may be set to four times, for example, and the relatively high magnification may be set to ten times, for example. Here, the magnification is not limited thereto. The command input from the user may be received from the input device 90, and the magnification for thickness estimation and the magnification for density estimation may be set in advance.

In this embodiment, the plurality of captured images obtained by imaging a subject under the condition in which the numerical aperture of the objective lens is changed are not limited to the captured images obtained by imaging the subject under the condition in which the magnification of the objective lens is changed as described above, and as described later, may include captured images obtained by imaging the subject under a condition in which the size of an aperture stop is changed and captured images obtained by imaging the subject under a condition in which a wavelength of illumination light is changed. That is, as long as the numerical aperture of the objective lens is change as a result, a change of different conditions of the optical system may be used, instead of the magnification of the lens.

The imaging section 40 comprises an imaging element that receives light of an image of the subject S captured by the image forming lens 33 and forms a phase difference image of the subject S. The imaging element may employ a charge-coupled device (CCD) image sensor, a complementary metal-oxide semiconductor (CMOS) image sensor, or the like.

The microscope control device 50 is configured by a computer that comprises a central processing unit (CPU), a semiconductor memory, a hard disk, and the like.

The microscope control device 50 controls an entire operation of the phase difference microscope body, and specifically, comprises a controller 51 that includes the CPU, an image acquisition section 52, a thickness estimation section 53, and a density estimation section 54, as shown in FIG. 1. In this embodiment, the microscope control device 50 corresponds to the captured image evaluation apparatus according to the embodiment of the invention. In a memory or a hard disk of the microscope control device 50, an embodiment of the captured image evaluation program of the invention is installed. As the program is executed by the controller 51, the image acquisition section 52, the thickness estimation section 53, and the density estimation section 54 perform their functions.

The controller 51 controls an operation of the phase difference microscope body, and specifically, controls operations of the illumination light emission section 10, the stage driving section 62, and the imaging section 40, for example.

The controller 51 controls driving of the stage driving section 62, to thereby move the stage 61 in the X direction and the Y direction. As the stage 61 is moved in the X direction and the Y direction, for example, the inside of one cell is scanned by illumination light for phase difference measurement, and a phase difference image in each of a plurality of imaging regions (fields of view) divided inside one cell is imaged.

The image acquisition section 52 acquires the phase difference image of the subject S output from the imaging section 40 as a captured image, and stores the result.

Figure 2:
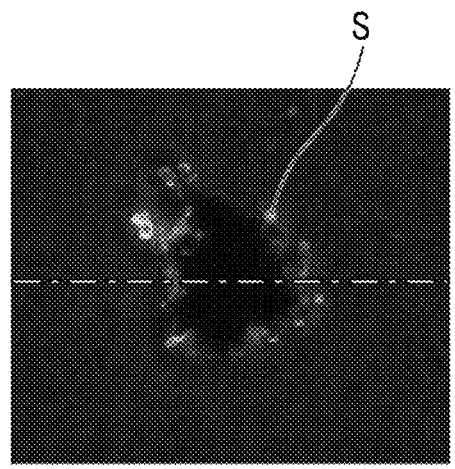
FIG. 2 is a diagram showing an example of a low NA captured image.
Figure 3:
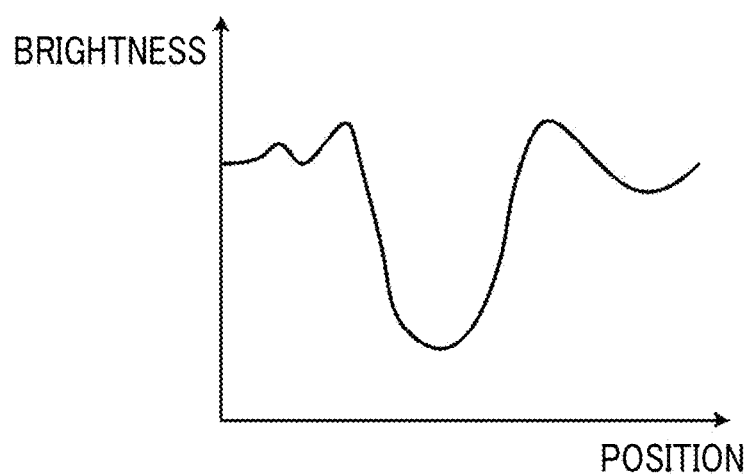
FIG. 3 is a diagram showing an example of a brightness distribution acquired on the basis of the low NA captured image.
Figure 4:
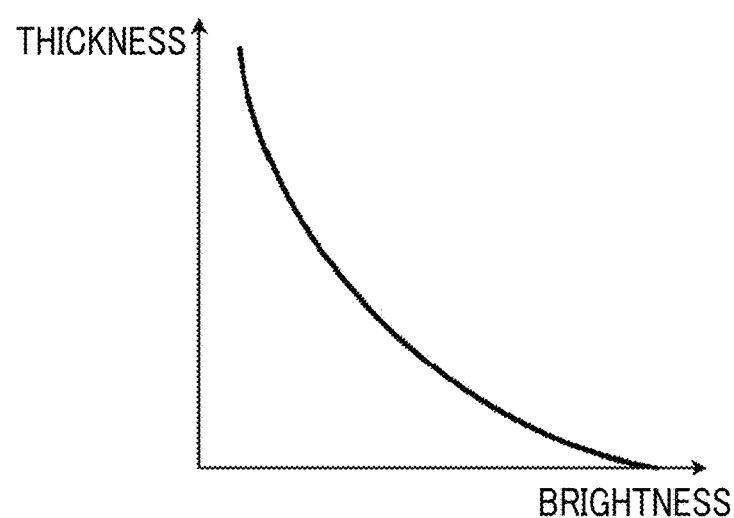
FIG. 4 is a diagram showing an example of a table showing a relationship between the brightness of the low NA captured image and a thickness of a subject.
Figure 5:
FIG. 5 is a diagram showing an example of an estimation result of the thickness of the subject.

The thickness estimation section 53 estimates the thickness of a cell group that is the subject S on the basis of a low NA captured image obtained at a relatively low magnification. For example, in a case where a low NA captured image as shown in FIG. 2 is input, the thickness estimation section 53 acquires a brightness distribution along a single dot chain line shown in FIG. 2. FIG. 3 is a diagram showing an example of a brightness distribution. In the thickness estimation section 53, a table indicating a relationship between a brightness of a low NA captured image as shown in FIG. 4 and a thickness of the subject S is set in advance. The thickness estimation section 53 calculates a corresponding thickness with reference to the table shown in FIG. 4, with respect to a brightness at each position of the brightness distribution shown in FIG. 3, and thus, estimates a distribution of thicknesses at respective positions of the subject S as shown in FIG. 5.

In the above description, the thickness on the single dot chain line shown in FIG. 2 is estimated, but the invention is not limited thereto, and a distribution of two-dimensional thicknesses of the subject S may be estimated by setting line segments that cross the subject S in a plurality of directions and estimating thicknesses on the respective line segments. Further, a user may set and input a direction of a segment for estimating a thickness using the input device 90.

Further, the Table shown in FIG. 4 in which the brightness and the thickness are associated with each other may be set for each magnification of the objective lens 31. In a case where the magnification of the objective lens 31 is changed, the table may be automatically changed in accordance with the magnification change.

Figure 6:
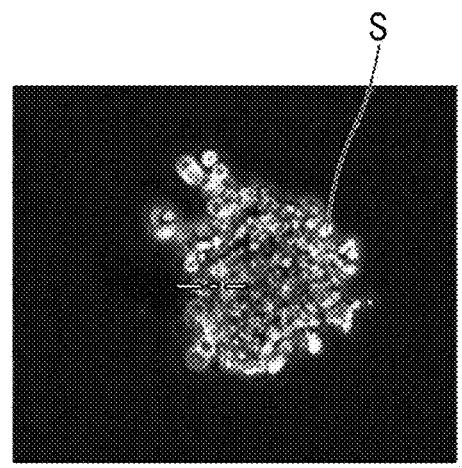
FIG. 6 is a diagram showing an example of a low NA captured image.
Figure 7:
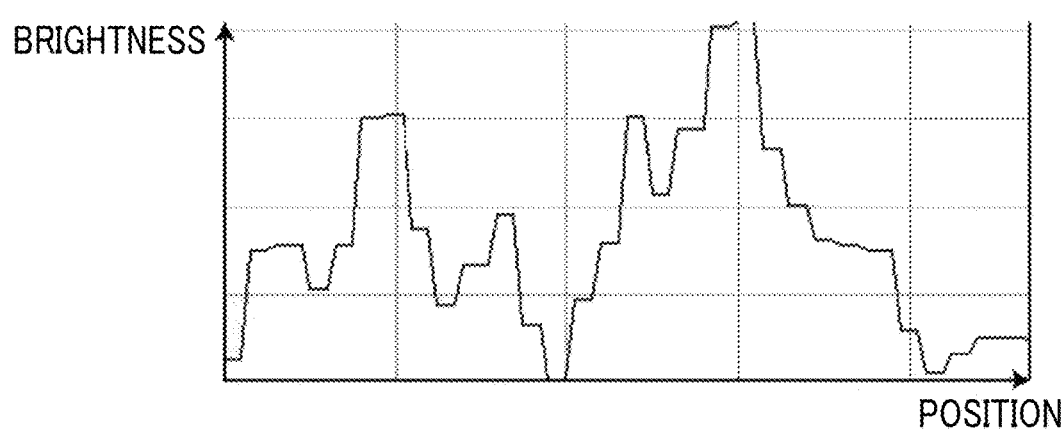
FIG. 7 is a diagram showing an example of a brightness distribution acquired on the basis of the low NA captured image.
Figure 8:
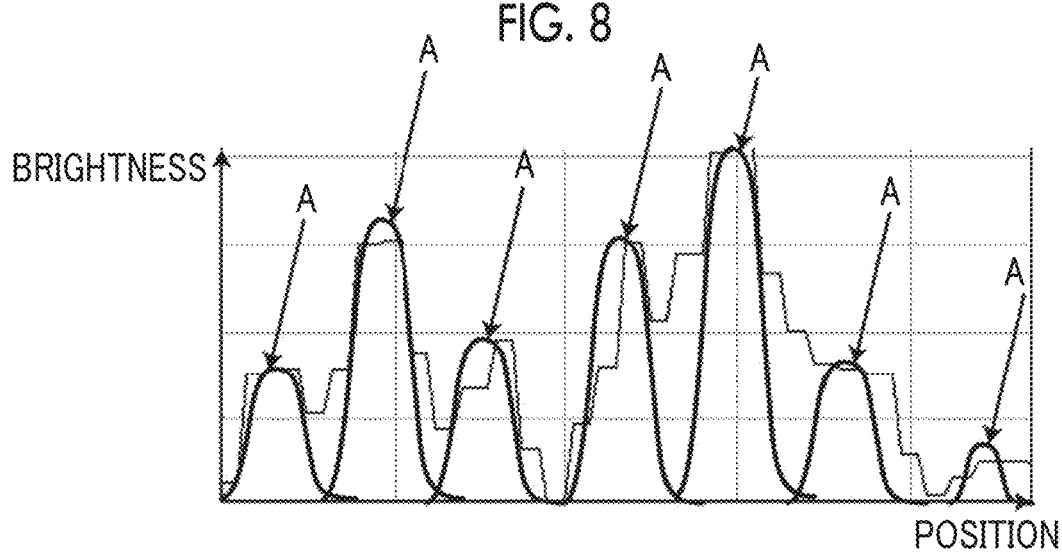
FIG. 8 is a diagram showing a result obtained by approximating the brightness distribution shown in FIG. 7 using a Gaussian function.

The density estimation section 54 estimates a density (the degree of concentration) of cells of the cell group that is the subject S on the basis of a high NA captured image obtained at a relatively high magnification. In a case where a high NA captured image as shown in FIG. 6 is input, for example, the density estimation section 54 acquires a brightness distribution along a single dot chain line shown in FIG. 6. FIG. 7 is a diagram showing an example of a brightness distribution. Further, the density estimation section 54 estimates the density of cells on the basis of the shape of the brightness distribution shown in FIG. 7. Specifically, the density estimation section 54 approximates the brightness distribution using the Gaussian function. A thick solid line shown in FIG. 8 represents a result obtained by approximating a thin solid brightness distribution using the Gaussian function. Then, the density estimation section 54 calculates the number of peaks indicated by arrows A from the approximation result of the Gaussian function shown in FIG. 8. Further, the density estimation section 54 counts the number of peaks per unit area to estimate the density (the degree of concentration) of the cells. That is, the density estimation section 54 estimates the density of the cells by assuming that one peak in the brightness distribution corresponds to one cell.

In the above description, the density of the cells on the single dot chain line shown in FIG. 6 is estimated, but a user may set and input a segment line for estimating the density using the input device 90. Further, a range for estimating the density may be designated in two dimensions using a rectangular range or a circular range, instead of the segment.

Figure 9:
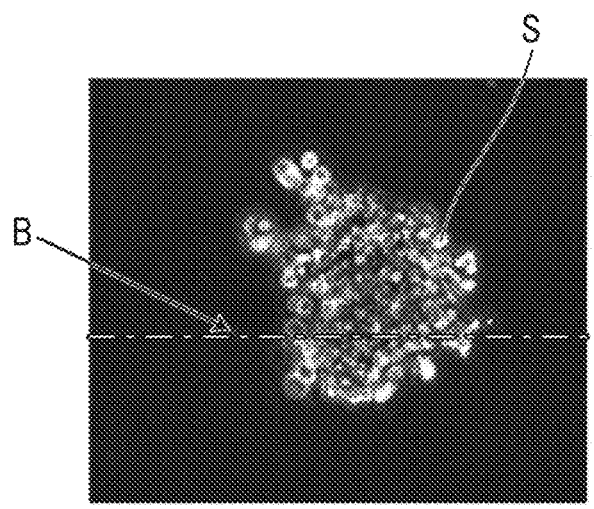
FIG. 9 is a diagram showing an example of a high NA captured image including an image of rubbish.

Further, there is a case where a high NA captured image includes an image of a small amount of rubbish, or the like, in addition to cells. In a case where such a rubbish image is shown on a brightness distribution as a peak, it is not possible to calculate the density of the cells with high accuracy. FIG. 9 shows an example of a high NA captured image including such a rubbish image, in which a portion indicated by an arrow B in FIG. 9 corresponds to a rubbish image.

Figure 10:
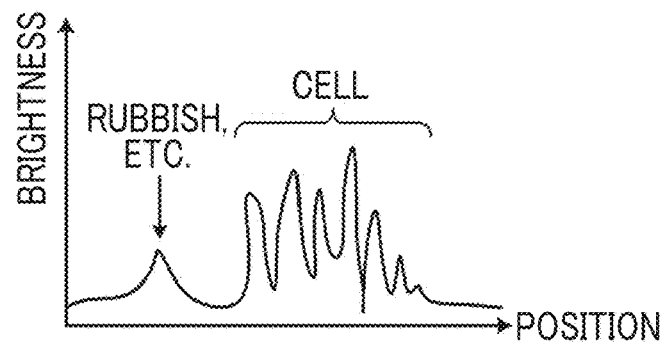
FIG. 10 is a diagram showing an example of a brightness distribution including a peak based on the image of rubbish.

Further, in order to calculate the density of the cells with high accuracy, it is preferable to remove the above-mentioned peak due to the rubbish image. Specifically, in a case where the brightness distribution in a single dot chain line shown in FIG. 9 is acquired, a peak based on an image of rubbish or the like appears at a position spaced from a peak group based on an image of cells, as shown in FIG. 10. Thus, in a case where a peak indicated by an arrow in FIG. 10 is present, it is preferable to calculate the number of peaks after the peak is removed as an isolation point due to the image of the rubbish or the like, and then, to estimate the density of the cells.

The thickness of the subject S estimated by the thickness estimation section 53 and the density of the subject S estimated by the density estimation section 54 are output to the controller 51. The controller 51 displays the input thickness and density of the subject S on the display device 80 as a text, or outputs the result to another external device. In this embodiment, the controller 51 corresponds to an output section of the invention.

Returning to FIG. 1, the microscope control device 50 is connected to the input device 90 and the display device 80. The input device 90 is provided with an input device such as a keyboard or a mouse, and receives a setting input from a user. Particularly, the input device 90 in this embodiment receives setting inputs of a command for magnification change of the objective lens 31, a command for estimation of the thickness and density of the subject S, and the like.

The display device 80 is configured of a display device such as a liquid crystal display, and displays a captured image (phase difference image) obtained by imaging in the imaging section 40, estimation results of the thickness and density of the subject S. or the like. Here, the display device 80 may be configured using a touch panel, so that the display device 80 may be used as the input device 90.

Figure 11:
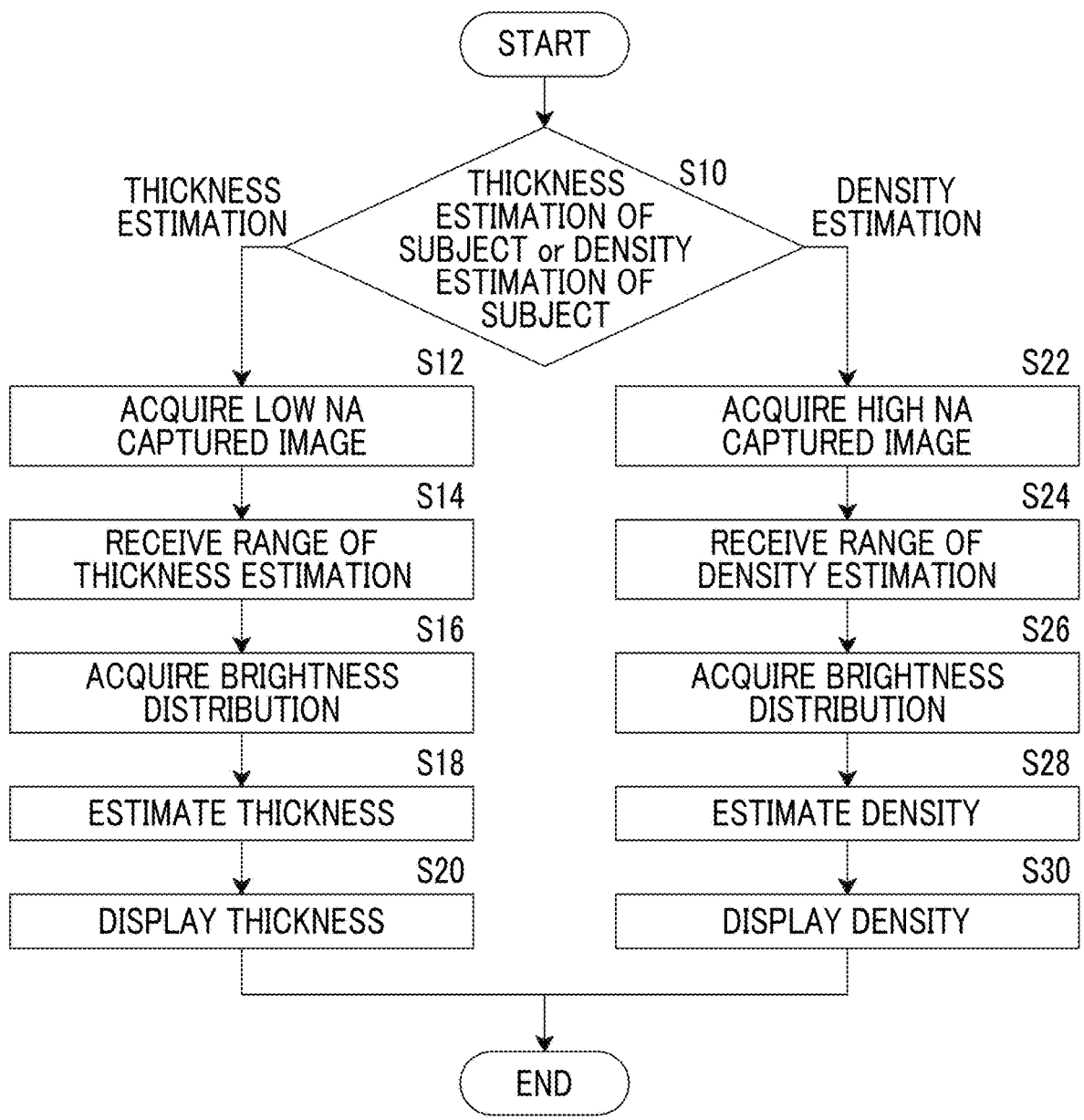
FIG. 11 is a flowchart for illustrating an operation of the microscope image evaluation system using the embodiment of the captured image evaluation apparatus of the invention.

Next, an operation of the microscope image evaluation system of this embodiment will be described with reference to a flowchart shown in FIG. 11. Since the microscope image evaluation system of this embodiment has a characteristic in estimating the thickness and density of the subject S on the basis of a captured image obtained by imaging the subject S, this characteristic will be mainly described.

First, a command input for estimation of the thickness of the subject S or estimation of the density of the subject S is input through the input device 90 from a user (S10).

In a case where the command input for estimation of the thickness of the subject S is input from the user, a low NA captured image is acquired by the image acquisition section 52 (S12). The low NA captured image may be automatically selected from captured images that are obtained by imaging at different magnifications and stored, or may be captured and acquired at a low magnification by the phase difference microscope body when the command input for estimation of the thickness of the subject S is performed from the user. Further, a plurality of captured images that are obtained by imaging at different magnifications may be displayed on the display device 80, and a low NA captured image obtained at a low magnification may be selected by the user using the input device 90. Here, in a case where the user selects a captured image having a magnification higher than a threshold value having a predetermined magnification, it is determined that the captured image is not suitable for thickness estimation, and then, an alarm display or the like may be provided. Further, when a plurality of captured images are displayed on the display device 80, a mark may be provided to a captured image having a magnification that is equal to or smaller than a threshold value of a predetermined magnification and suitable for thickness estimation. Further, a method for selecting two unspecified images from a plurality of captured images obtained by imaging a subject under a condition in which the numerical aperture of the objective lens is changed, comparing imaging conditions of the two images, and determining a low NA captured image obtained under the condition in which the numerical aperture of the objective lens is relatively small and a high NA captured image obtained captured under the condition in which the numerical aperture of the objective lens is relatively large may be used.

The low NA captured image acquired by the image acquisition section 52 is input to the thickness estimation section 53. Further, for example, on the low NA captured image displayed on the display device 80, a range for estimating the thickness is designated by the user using the input device 90 (S14).

The thickness estimation section 53 acquires a brightness distribution of the low NA captured image as described above on the basis of the range of estimation of the thickness input from the user (S16). Further, on the basis of the brightness distribution, the estimation of the thickness is performed with reference to the table as shown in FIG. 4 (S18). The thickness of the subject S estimated by the thickness estimation section 53 is displayed on the display device 80 under the control of the controller 51 (S20).

Returning to S10, in a case where the command input for estimation of the density of the subject S is performed by the user, a high NA captured image is acquired by the image acquisition section 52 (S22). Similar to the low NA captured image, the high NA captured image may be automatically selected from captured images that are obtained by imaging at different magnifications and stored in advance. Alternatively, when the command input for estimation of the thickness of the subject S is performed by the user, the high NA captured image may be acquired by imaging at a high magnification by the phase difference microscope body. Further, a plurality of captured images that are obtained by imaging at different magnifications may be displayed on the display device 80, and a high NA captured image obtained at a high magnification may be selected by the user using the input device 90. Here, in a case where the user selects a captured image having a magnification lower than a threshold value having a predetermined magnification, it is determined that the captured image is not suitable for density estimation, and then, an alarm display or the like may be provided. Further, when a plurality of captured images are displayed on the display device 80, a mark may be provided to a captured image having a magnification that is equal to or greater than a threshold value of a predetermined magnification and suitable for density estimation.

The high NA captured image acquired by the image acquisition section 52 is input to the density estimation section 54. Further, for example, on the high NA captured image displayed on the display device 80, a range for estimating the density is designated by the user using the input device 90 (S24).

The density estimation section 54 acquires a brightness distribution of the high NA captured image as described above, on the basis of the range of estimation of the density input from the user (S26). Further, the brightness distribution is approximated using the Gaussian function, and then, the number of peaks is counted to perform the estimation of the density (S28). The density of the subject S estimated by the density estimation section 54 is displayed on the display device 80 under the control of the controller 51 (S30).

In the above description, the estimation of the thickness of the subject S and the estimation of the density are selectively performed, but the invention is not limited thereto, and both of the estimation of the thickness of the subject S and the estimation of the density may be simultaneously performed in parallel.

According to the microscope image evaluation system of this embodiment, a captured image obtained by imaging the subject S is acquired under the condition in which the numerical aperture of the objective lens 31 is changed, the thickness of the subject S is estimated on the basis of the low NA captured image obtained under the condition in which the numerical aperture of the objective lens 31 is relatively small, and the density of the subject S is estimated on the basis of the high NA captured image obtained under the condition in which the numerical aperture of the objective lens 31 is relatively large. Accordingly, since it is sufficient if two times of imaging of the low NA captured image and the high NA captured image can be performed, it is possible to evaluate the thickness and the density of the subject S in a short imaging time.

Further, since it is sufficient if analysis of two captured images of the low NA captured image and the high NA captured image can be performed, compared with a method for analyzing multiple sectional images in the related art, it is possible to reduce a load of the analysis process. Further, as in the embodiment, in a case where the evaluation is performed using the brightness distribution, it is possible to estimate the thickness and the density of the subject through a more simplified process.

In the above-described embodiment, a captured image obtained at a low magnification is acquired as a low NA captured image, and a captured image obtained at a high magnification is acquired as a high NA captured image, but the invention is not limited thereto. For example, a captured image obtained using an aperture stop having a relatively small aperture may be acquired as a low NA captured image, and a captured image obtained using an aperture stop having a relatively large aperture may be acquired as a high NA captured image.

Figure 12:
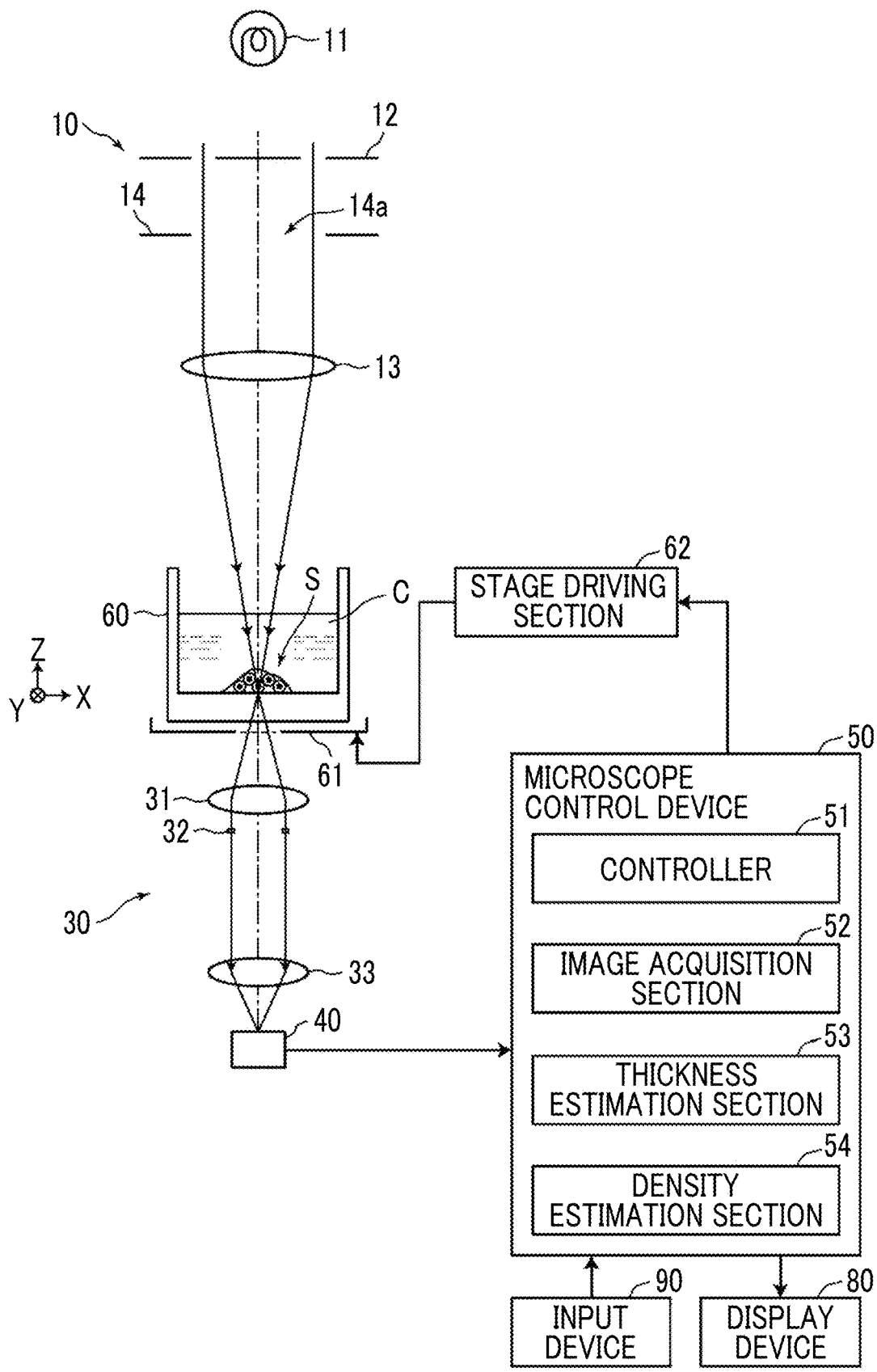
FIG. 12 is a diagram showing a schematic configuration of the microscope image evaluation system using another embodiment of the captured image evaluation apparatus of the invention.

FIG. 12 shows a configuration in which the above-described aperture stop 14 is provided with respect to the phase difference microscope body of the microscope image evaluation system of this embodiment.

The aperture stop 14 is formed with an aperture 14a through which ring-shaped illumination light passes. The size of the aperture 14a may be configured to be changeable. The change of the size of the aperture 14a may be manually performed, or may be automatically performed. For example, in a case where a command input for performing estimation of the thickness of the subject S is received from a user, the aperture 14a of the aperture stop 14 may be automatically changed to become relatively large. In a case where a command input for performing estimation of the density of the subject S is received from a user, the aperture 14a of the aperture stop 14 may be automatically changed to become relatively small. The command input from the user may be received through the input device 90, or the size of the aperture 14a for thickness estimation and the size of the aperture 14a for density estimation may be set in advance.

Further, a wavelength of illumination light of the phase difference microscope body may be configured to be changeable, and then, a captured image obtained with illumination light of a relatively long wavelength may be acquired as a low NA captured image, and a captured image obtained with illumination light of a relatively short wavelength may be acquired as a high NA captured image. As a method for changing the wavelength of the illumination light, a light source having a different wavelength may be configured to be manually or automatically changed, or a method for providing an optical filter to which illumination light emitted from the light source is incident and manually or automatically changing the optical filter to change the wavelength of the illumination light may be used. As the wavelength of the illumination light in capturing the low NA captured image, for example, a wavelength of about 780 nm may be used, and as the wavelength of the illumination light in capturing the high NA captured image, for example, a wavelength of about 405 nm may be used.

In the above-described embodiment, the invention is applied to the phase difference microscope, but the invention is not limited to the phase difference microscope, and may be applied to other microscopes such as a differential interference microscope or a bright field microscope.

EXPLANATION OF REFERENCES

10: illumination light emission section
11: white light source
12: slit plate
13: condenser lens
14: aperture stop
14a: aperture
30: imaging optical system
31: objective lens
32: phase plate
33: image forming lens
40: imaging section
50: microscope control device
51: controller
52: image acquisition section
53: thickness estimation section
54: density estimation section
60: culture container
61: stage
62: stage driving section
80: display device
90: input device
S: subject

What is claimed is:

1. A captured image evaluation apparatus comprising:
a processor configured to
acquire a plurality of captured images obtained by imaging a subject under conditions in which a numerical aperture ("NA") of an objective lens is different;
acquire a brightness distribution of a low NA captured image among the plurality of captured images;
estimate a thickness of the subject on the basis of the brightness distribution of the low NA captured image according to a table in which a brightness of the low NA captured image and the thickness of the subject are associated with each other;
acquire a brightness distribution of a high NA captured image obtained under a condition in which the numerical aperture of the objective lens is larger than the numerical aperture of the objective lens of the low NA captured image, among the plurality of captured images, and
estimate a density of the subject by calculating a number of peaks per unit area included in the brightness distribution of the high NA captured image;
wherein a level of magnification sets a threshold, wherein the thickness of the subject is estimated below the threshold, and wherein the density of the subject is estimated above the threshold.

2. The captured image evaluation apparatus according to claim 1,
wherein the processor is further configured to estimate the density of the subject on the basis of a shape of the brightness distribution.

3. The captured image evaluation apparatus according to claim 1,
wherein the processor is further configured to approximate the brightness distribution using a Gaussian function to calculate the peak.

4. The captured image evaluation apparatus according to claim 1,
wherein the high NA captured image is a captured image obtained at a higher magnification than the low NA captured image.

5. The captured image evaluation apparatus according to claim 2,
wherein the high NA captured image is a captured image obtained at a higher magnification than the low NA captured image.

6. The captured image evaluation apparatus according to claim 1,
wherein the high NA captured image is a captured image obtained by illumination light of a shorter wavelength than the low NA captured image.

7. The captured image evaluation apparatus according to claim 2,
wherein the high NA captured image is a captured image obtained by illumination light of a shorter wavelength than the low NA captured image.

8. The captured image evaluation apparatus according to claim 1,
wherein the high NA captured image is a captured image obtained using an aperture stop having a larger aperture than the low NA captured image.

9. The captured image evaluation apparatus according to claim 1,
wherein the processor is further configured to output the estimated thickness of the subject and the estimated density of the subject.

10. A captured image evaluation method comprising:
acquiring a plurality of captured images obtained by imaging a subject under conditions in which a numerical aperture ("NA") of an objective lens is different;

acquiring a brightness distribution of a low NA captured image among the plurality of captured images;

estimating a thickness of the subject on the basis of the brightness distribution of the low NA captured image according to a table in which a brightness of the low NA captured image and the thickness of the subject are associated with each other;

acquiring a brightness distribution of a high NA captured image obtained under a condition in which the numerical aperture of the objective lens is larger than the numerical aperture of the objective lens of the low NA captured image, among the plurality of captured images, and estimating a density of the subject by calculating a number of peaks per unit area included in the brightness distribution of the high NA captured image;

wherein a level of magnification sets a threshold, wherein the thickness of the subject is estimated below the threshold, and wherein the density of the subject is estimated above the threshold.

11. A non-transitory computer recording medium storing a captured image evaluation program that causes a computer to perform a method of, the method comprising:

acquiring a plurality of captured images obtained by imaging a subject under conditions in which a numerical aperture ("NA") of an objective lens is different;

acquiring a brightness distribution of a low NA captured image among the plurality of captured images;

estimating a thickness of the subject on the basis of the brightness distribution of the low NA captured image according to a table in which a brightness of the low NA captured image and the thickness of the subject are associated with each other;

acquiring a brightness distribution of a high NA captured image obtained under a condition in which the numerical aperture of the objective lens is larger than the numerical aperture of the objective lens of the low NA captured image, among the plurality of captured images; and estimating a density of the subject by calculating a number of peaks per unit area included in the brightness distribution of the high NA captured image;

wherein a level of magnification sets a threshold, wherein the thickness of the subject is estimated below the threshold, and wherein the density of the subject is estimated above the threshold.

* * * * *